United States Patent [19]
Husted et al.

[11] Patent Number: 5,697,670
[45] Date of Patent: Dec. 16, 1997

[54] VEHICLE SEAT

[75] Inventors: David W. Husted, Ann Arbor; Timothy Butt, Plymouth, both of Mich.

[73] Assignee: Hoover Universal, Inc., Plymouth, Mich.

[21] Appl. No.: 746,460

[22] Filed: Nov. 12, 1996

[51] Int. Cl.$^6$ .............................. B60N 2/42; B60R 21/02
[52] U.S. Cl. .............. 297/216.13; 297/478; 297/452.18; 297/483
[58] Field of Search .................. 297/216.1, 216.13, 297/216.14, 452.18, 478, 483, 484, 470, 216.19; 296/68.1

[56] References Cited

U.S. PATENT DOCUMENTS

| | | |
|---|---|---|
| 3,761,127 | 9/1973 | Giese et al. . |
| 3,847,434 | 11/1974 | Weman ................... 297/478 |
| 4,738,485 | 4/1988 | Rumpf ................... 297/216.19 |
| 5,246,271 | 9/1993 | Boisset . |
| 5,295,729 | 3/1994 | Viano ................... 297/216.14 |
| 5,299,853 | 4/1994 | Griswold et al. . |
| 5,310,247 | 5/1994 | Fujimori et al. . |
| 5,318,341 | 6/1994 | Griswold et al. . |
| 5,366,268 | 11/1994 | Miller et al. ................... 297/216.1 |
| 5,393,123 | 2/1995 | Hernandez et al. . |

FOREIGN PATENT DOCUMENTS

01021708  3/1984  European Pat. Off. .

Primary Examiner—Peter M. Cuomo
Assistant Examiner—Anthony D. Barfield
Attorney, Agent, or Firm—Harness, Dickey & Pierce, P.L.C.

[57] ABSTRACT

A vehicle seat which carries a passenger restraint system, namely a lap belt and a shoulder belt, with a tension load carrying member being provided to resist forward rotation and bending of the backrest frame during a frontal vehicle collision when the shoulder belt is loaded in tension. The tension load carrying member forms a truss structure with the frame back portion and the frame base portion. However, during normal vehicle operation, the tension load carrying member is detached from the frame back portion eliminating the truss structure and the need for a more complex recliner mechanism for adjusting the position of the backrest. A grip mechanism is provided to attach the load carrying member in response to a high shoulder belt load to complete the truss. In an alternative embodiment, the load carrying member is released from the backrest only during adjustment of the backrest.

16 Claims, 5 Drawing Sheets

VEHICLE SEAT

BACKGROUND AND SUMMARY OF THE INVENTION

The present invention relates to a vehicle seat of the type which carries a shoulder belt coupled to the backrest and in particular to such a seat having a load carrying member which couples to the backrest frame to form a truss structure to resist forward rotation of the backrest during a vehicle collision and releases to enable adjustment of the backrest angle.

Motor vehicles are typically provided with an occupant restraint system comprised of belts which, for front seat occupants, includes a lap belt and a shoulder belt. These belts restrain an occupant within a vehicle seat. Most often, the belt restraint system is mounted directly to the vehicle structure adjacent to the vehicle seat. The position of the vehicle seat, relative to the vehicle body, is adjustable in at least the fore and aft direction and may be adjustable in other directions as well. When the belt restrain system is mounted to the vehicle, the seat is moved relative to the belt restraint system such that it can become inconvenient or uncomfortable for a seat occupant to use the belt restraint system. For example, if the vehicle seat is moved to its forward most position, it may be difficult to reach rearward to grasp the belt mounted to the vehicle behind the seat. Furthermore, in this forward most position, the shoulder belt may rub across the occupant's neck, creating discomfort.

Accordingly, it is becoming more common to mount the belt restraint system directly to the seat so that the restraint system moves with the seat during adjustment. However, with the attachment of the restraint system to the seat, it is necessary to increase the load carrying capability of the seat compared to seats that do not support the restraint system. The result of increasing the seat strength is often an increase in the seat weight. This weight increase is contrary to the desire of vehicle manufacturers to remove weight from motor vehicles and thus improve fuel efficiency.

Areas of a vehicle seat which typically need to be strengthened to accommodate the restraint system loads are the backrest frame and the recliner mechanism. Various approaches have been taken to strengthen the backrest and recliner mechanism. An example is shown in U.S. Pat. No. 5,318,341, commonly assigned with the present application. In that patent, one upright pilar of the backrest frame is reinforced to accommodate the shoulder belt load. In addition, a forward extending brace is attached to the backrest frame and extends forward to the base portion of the frame to resist forward rotation of the backrest. The brace forms a truss in combination with the backrest frame and the base portion of the frame Such an approach adds considerable weight to the seat frame. Such a truss structure also requires a complex reclining mechanism, dissimilar to conventional recliners used with seats that do not carry a belt restraint system. The recliner consists of a lead screw mounted to the frame base portion. A nut carried by the brace is threaded onto the screw. The backrest is reclined by rotating the screw and changing the effective length of the frame base portion component of the truss.

Accordingly, it is an object of the present invention to provide increased load carrying capability to a vehicle seat to accommodate the restraint system load while minimizing the increase in the seat weight.

Another object of the invention is to develop a seat with a belt restraint system attached thereto which uses a readily available recliner mechanism of a conventional design used in seats that do not have a belt restraint system attached thereto.

It is a feature of the present invention to provide a vehicle seat frame with a tension load carrying member which is attached to the frame base portion, rearward of the backrest, and which extends upwardly to the backrest frame. The tension load carrying member is coupled to the upper end of the backrest frame during a collision to resist forward rotation of the backrest. The tension load carrying member is released from the backrest frame during adjustment of the backrest angle, thereby permitting conventional recliner to be used. Two types of mechanisms can be used. With one type of mechansim, the tension load carrying member is coupled to the backrest frame at all times except during backrest adjustment.

In the other type of mechanism, the tension load carrying member is only coupled to the backrest frame during a vehicle collision which produces tension in the shoulder belt of the seat restraint system. During a vehicle crash with a tension load on the shoulder belt, the shoulder belt load is used to cause the upper end of the load carrying member to be gripped, forming a triangular truss structure. The upper end of the load carrying member passes through a grip mechanism comprised of front and rear grip members attached to the backrest frame. The rear grip member is mounted to the backrest frame for forward rotation when a predetermined shoulder belt load is applied to the rear grip member. During a vehicle collision and a high tension load in the shoulder belt, the rear grip member moves forward, pinching and gripping the load carrying member such that the load carrying member can be loaded in tension and resist forward rotation of the backrest frame. In addition, the bending load carried by the backrest frame is reduced as well, enabling the backrest frame to be made lighter.

In the mechanism in which the tension load carrying member is always coupled except during backrest adjustments, the mechanism includes a pawl that is normally locked into engagement with the tension load carrying member. A cable coupled to the recliner release lever operates to release the pawl from the load carrying member and enable the backrest to be adjusted.

During normal operation, with the load carrying member detached from the backrest frame, there is no rigid triangular truss. Thus, a conventional recliner mechanism such as a pawl and sector, or rotary recliner can be used to replace a mechanism like that shown in the above referenced patent which uses continuously connected truss member and a mechanism for varying the length of the truss member to recline the backrest.

Further objects, features and advantages of the invention will become apparent from a consideration of the following description and the appended claims when taken in connection with the accompanying drawings.

3

DETAILED DESCRIPTION OF THE PREFERRED EMBODIMENT

Figures 1, 2:
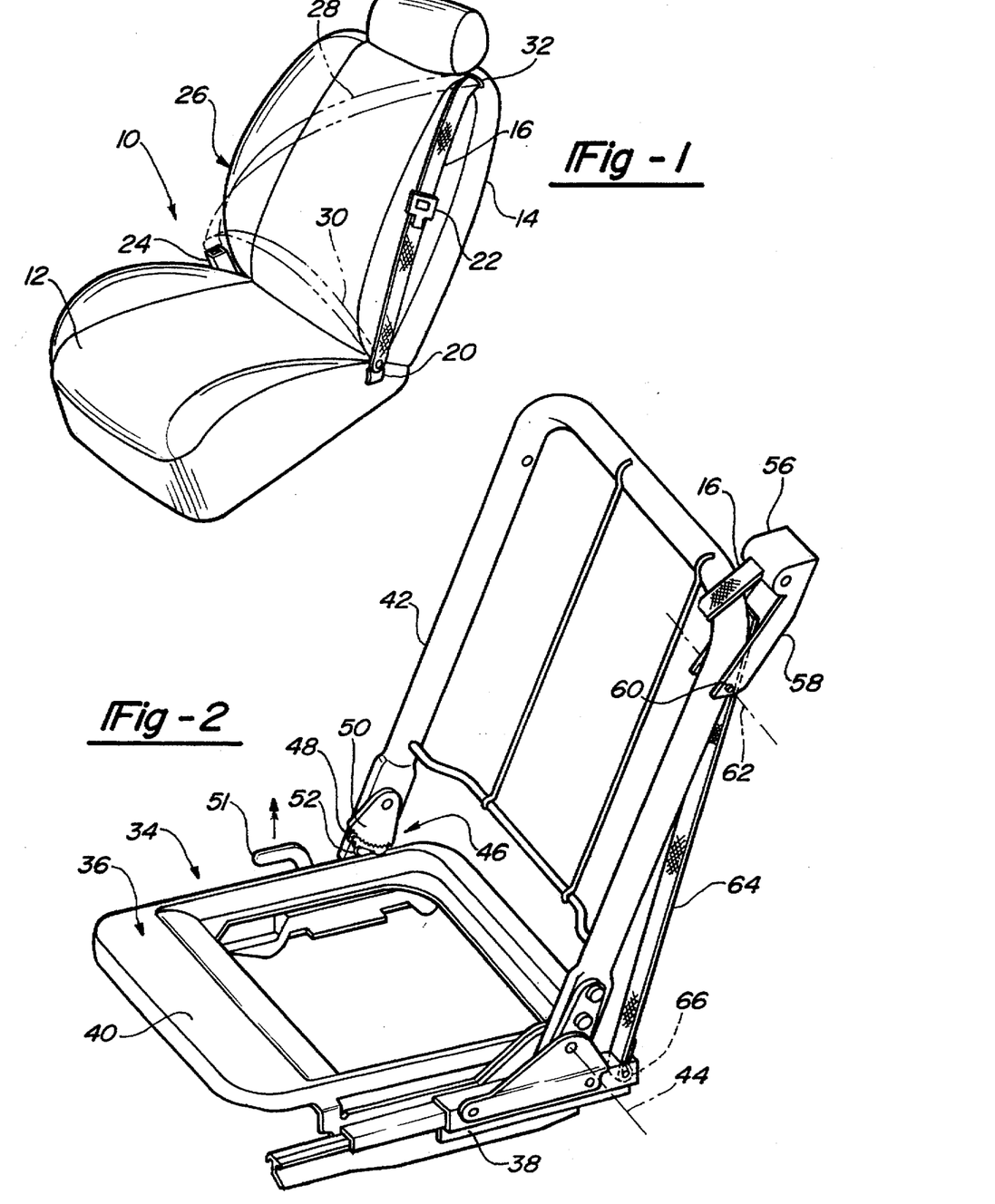
FIG. 1 is a perspective view of a vehicle seat of the present invention.
FIG. 2 is a perspective view of the frame of the seat shown in FIG. 1.

The vehicle seat of the present invention is shown in FIG. 1 and is designated generally at 10. Seat 10 includes a lower, generally horizontal seat part 12 and a backrest 14 extending generally upwardly at the rear of the lower seat part. An occupant restraint system is mounted to the seat and the includes a belt webbing 16. The webbing extends downwardly along the outboard side of the seat where one end of the webbing is attached to the lower seat part at its rear as indicated at 20. A clasp 22 is slidable along the webbing between the attachment 20 and the upper end of the backrest. A buckle mechanism 24 is attached to the inboard side 26 of the seat for reception of the clasp 22 therein. When the clasp 22 is inserted into the buckle, the webbing 16 forms a shoulder belt 28 which crosses over the torso of a seat occupant and a lap belt 30 which crosses the lap of a seat occupant to restrain the occupant within the seat 10. At the upper end of the backrest, the webbing passes into the backrest through the opening 32. The webbing is routed to a webbing retractor having a spool upon which excess webbing is wound. The retractor can be attached at the upper end of the backrest as described below, or it can be mounted at the base of the seat.

The terminology "inboard" and "outboard" is used as a convenience to designate the sides of the seat. As is typically the case, the shoulder belt extends from the upper, outboard side of the seat 10 to the lower, inboard side of the seat. The seat of the present invention has been shown and described in this manner. However, nothing herein should be construed to limit the seat of the present invention to such a belt configuration.

With reference to FIG. 2, the seat frame 34 is shown. Frame 34 has a base portion 36 which includes the fore and aft seat adjuster 38 and the seat pan 40 which supports the foam cushion of the lower seat part 12. A frame back portion 42 extends upwardly from the base portion 36 and provides the structural support within the backrest 14. The frameback portion 42 is mounted for rotation relative to the base portion about a transverse axis 44. The backrest is held in position about the axis 44 by a recliner mechanism 46.

In the embodiment shown in FIG. 2, the recliner mechanism includes a pawl 48 carried by the frame base portion which engages a sector gear 50 carried by the frame back portion to hold the backrest in place. A cam 52 acts on the pawl 48 to hold the pawl in engagement with the sector gear to lock the backrest in place. To adjust the angular position of the backrest, the recliner release lever 51 is pulled upward, moving the cam 52 out of engagement with pawl 48, allowing the pawl to disengage from the sector gear and the backrest to rotate about the axis 44. Such a pawl and sector recliner mechanism is well known in the vehicle seating art, particularly in seats that do not have a belt restraint system attached thereto. Other conventional retrac-

4 tor mechanisms, such as a rotary recliner with continuously engaged gears, can be used as well.

The seat belt webbing 16, after passing through the opening 32 into the backrest, is wound upon the spool of a retractor 56. In the embodiment shown in FIG. 2, the retractor 56 is mounted to a bracket 58 which is also referred to as a rear grip member as described below. The bracket 58 is pivotally coupled to the backrest by a shoulder bolt 60 for rotation about a second transverse axis 62 defined by the bolt 60. The bracket 58 is attached so that it will only rotate forward in response to a high tension load in the webbing 16, such as the load encountered during a vehicle collision. The belt load generated by normal vehicle operation in the absence of a vehicle collision is not sufficient to cause forward rotation of the bracket 58.

By coupling the webbing 16 to the backrest, during a vehicle collision, substantial load is applied to the backrest which must be transmitted to the base portion of the frame with minimal forward deformation of the backrest. This is necessary to prevent excessive forward movement of the seat occupant to provide the desired occupant protection. To resist both forward rotation of the backrest about the axis 44 as well as bending deformation of the frame back portion 42, a tension load carrying member 64 is provided along the outboard side of the seat, the same side carrying the retractor 56. The tension load carrying member is connected to the base portion 36 of the frame, rearward of the axis 44 by an anchor pin 66. The member 64 extends upward, toward the upper end of the frame back portion 42 and passes in front of the rear wall 70 of the bracket or rear grip member 58.

Figures 3, 4:
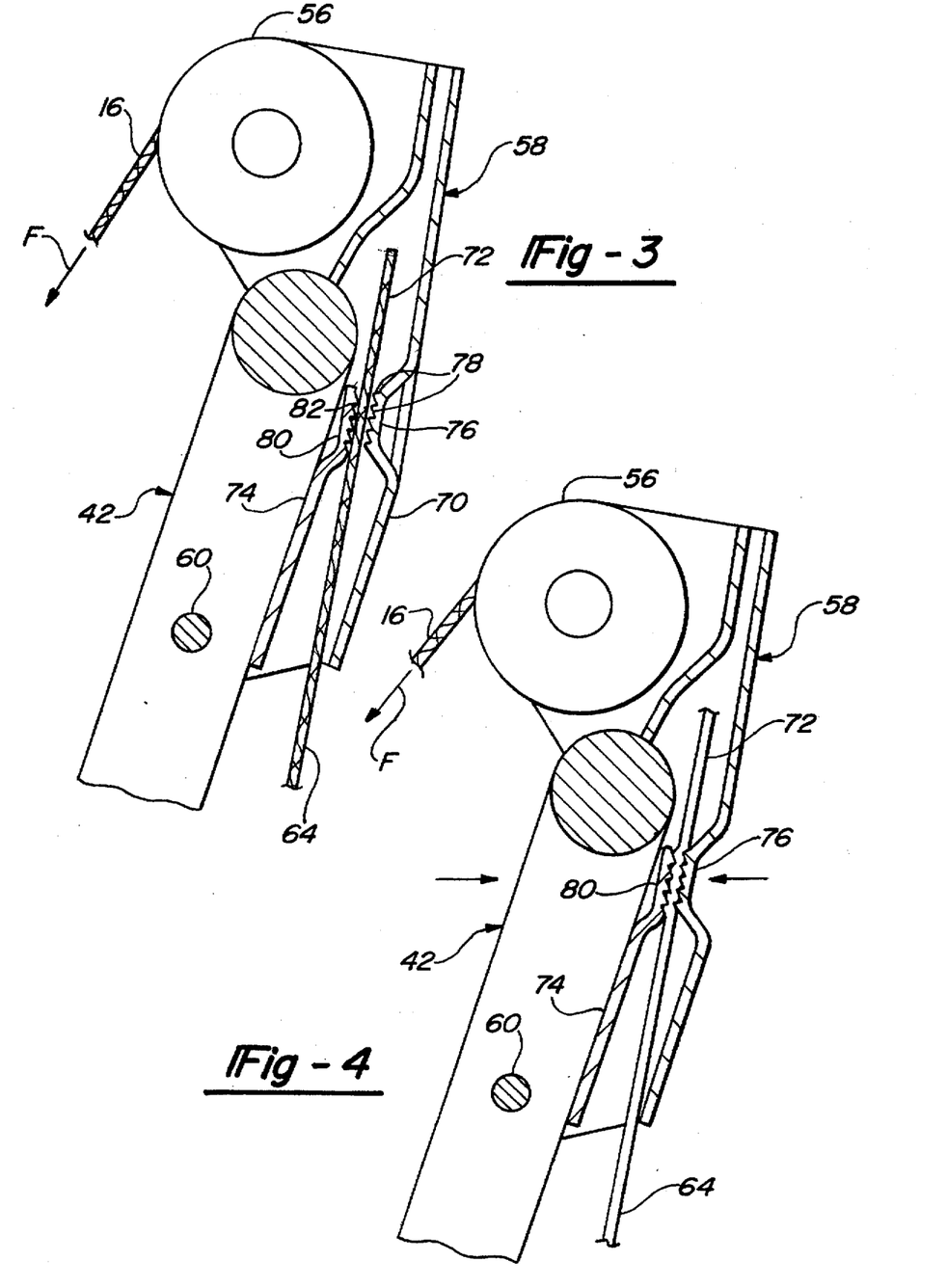
FIG. 3 is a fragmentary side elevation view of the upper end of the backrest frame illustrating the gripping mechanism for gripping the load carrying member.
FIG. 4 is a view similar to FIG. 3 illustrating the grippin mechanism in loaded position gripping the load carrying member.

The upper end portion 72 of the member 64 passes between the rear wall 70 of the rear grip member 58 and a front grip member 74 which is fixed to the frame back portion 42 and forms a part of the frame back portion. As shown in FIG. 3, the front grip member 74 is a separate component attached to the frame back portion. However, the front grip member could be formed integrally as a portion of the frame back portion 42 and not as a separate component attached thereto. The front and rear grip members are spaced apart from one another, providing clearance for the upper end portion 72 of the tension load carrying member to move freely there between. This enables the backrest to be rotated about the axis 44 and to be locked into position with the pawl and sector recliner mechanism or other conventional recliner mechanism. The tension load carrying member, during normal vehicle operation is not a load carrying member.

During a vehicle collision, particularly a frontal vehicle collision, a high tension force is produced in the belt webbing which acts on the retractor 56 in the direction of the arrow F in FIG. 3. This force has a forward component which acts on the rear grip member 58 above the second transverse axis 62. When the load F exceeds a predetermined quantity, the rear grip member 58 will rotate forward in a counter-clockwise direction as viewed in FIG. 3. This closes the gap between the front and rear grip members, bringing the front and rear grip members into engagement with the load carrying member 64, thus pinching and gripping the load carrying member. This securely attaches the upper end portion 72 of the load carrying member to the frame back portion 42. The member 64, the frame back portion 42 and the frame base potion 36 thus form a rigid triangular truss. The load carrying member is loaded in tension as it resists forward rotation of the backrest as well as forward bending of the frame back portion 42. Accordingly, the load carrying member 64 is also referred to as a tension load carrying member.

Preferably, the load carrying member 64 is in the form of a strap, a flat, narrow, elongated strip. The tension load carrying member is preferably made of a high strength steel such as Martinsite. The member could also be made of other high strength materials such as composite plastics, fiberglass or a woven fabric such as a seat belt webbing. The tension load carrying member is only capable of supporting loads in tension. It will bend under a compressive load.

The rear grip member 58 has a forwardly projecting engaging portion 76 with teeth 78 which engage the tension load carrying member 64. Likewise, the front grip member 74 has a engaging portion 80 with teeth 82. The teeth 78 and 82 aid in the gripping of the load carrying member 64.

Figures 5, 6:
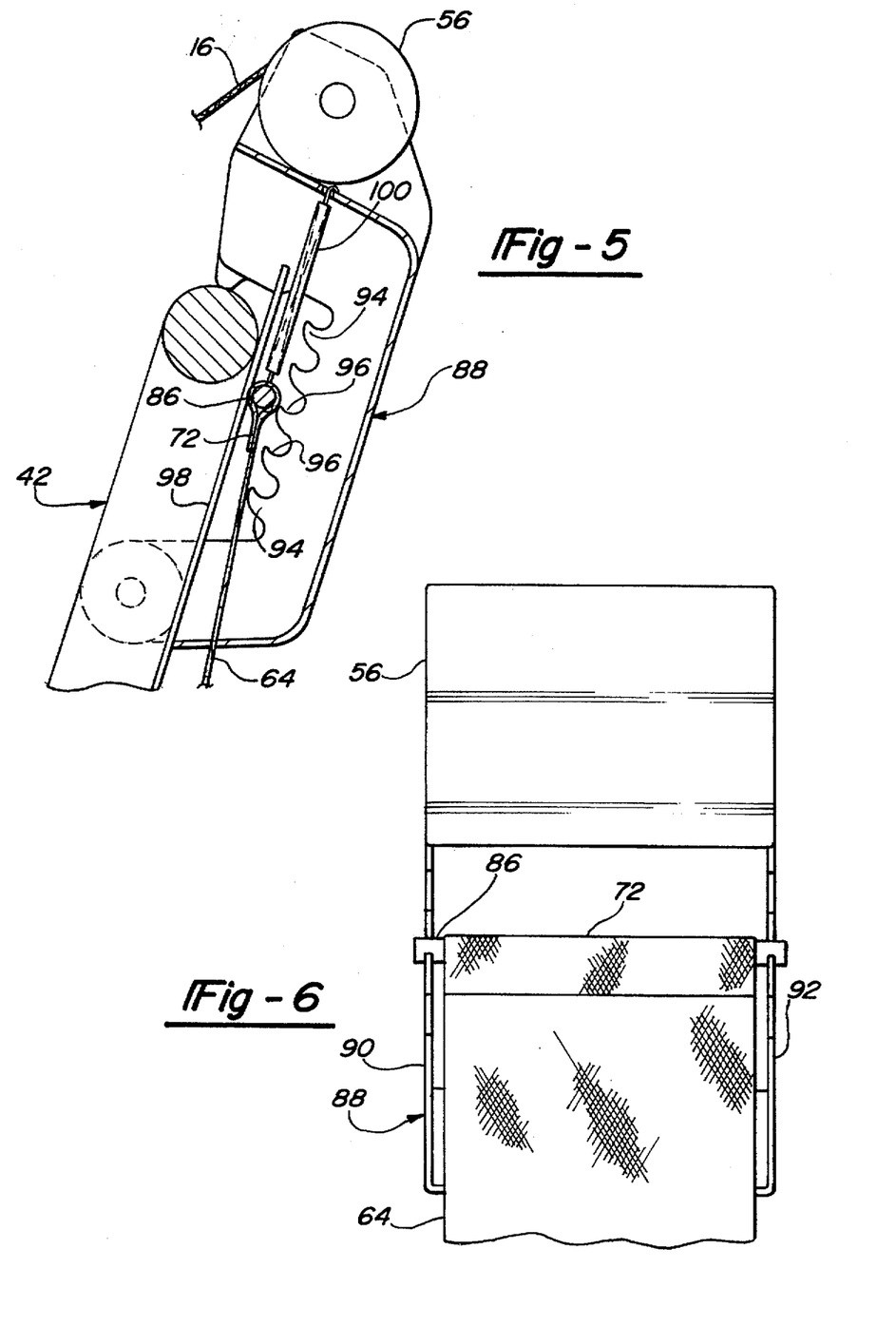
FIG. 5 is a fragmentary side elevation view of the frame illustrating an alternative embodiment of the gripping mechanism.
FIG. 6 is a front elevation al view of the gripping mechanism shown in FIG. 5.

With reference to FIGS. 5 and 6, an alternative embodiment of the seat is shown with a different mechanism for gripping the upper end portion of the member 64. In this embodiment, the upper end portion 72 of the member 64 is folded over on itself forming a loop which carries a pin 86. The pin 86 extends transversely beyond the edges of the member 64 so that the ends of the pin are exposed. The rear grip member 88 has side walls 90 and 92. The forward edges of the side walls 90 and 92 are formed with a plurality of vertically spaced, forwardly projecting and upwardly facing hooks 94. The surfaces 96 of the hooks are shaped to receive and engage the surface of the pin 86 on each side of the member 64 to pull upward on the pin and apply a tension load to the member 64. The front grip 98 forms a bearing surface to prevent forward displacement of the pin 86 when the rear grip member 88 is rotated forward to engage the pin. When the rear grip member 88 is rotated forward, the backrest is permitted to rotate forward slightly until the pin 86 seats into one of the hooks 94. A spring 100 biases the pin 86 upward and out of engagement with the hooks 94 during normal vehicle operation to prevent inadvertent engagement of the pin with the hooks that would prevent forward adjustment of the backrest position.

Figures 7, 8:
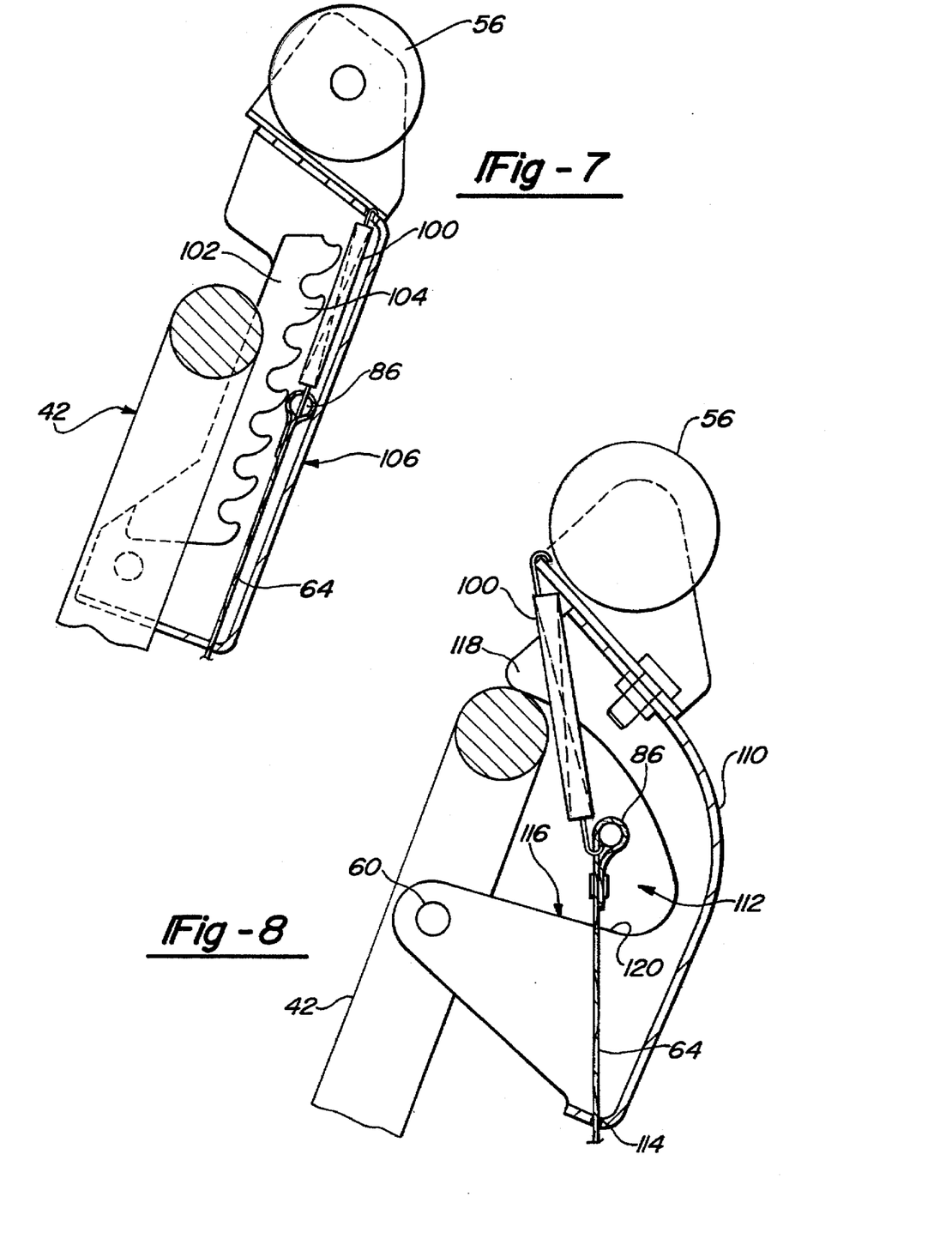
FIG. 7 is a fragmentary side elevation view of the frame illustrating another alternative embodiment of the gripping mechansim.
FIG. 8 is a fragmentary side elevation veiw of the frame illustrating yet another alternative embodiment of the gripping means.

With reference to FIG. 7, another embodiment of the invention is shown. This embodiment is similar to the embodiment shown in FIGS. 5 and 6. Here the front grip member 102 is formed with a plurality of vertically spaced, rearwardly projecting and upwardly facing hooks 104 which are configured to receive the pin 86. The rear grip member 106 forms a bearing surface which pushes the pin 86 forward when the rear grip member is rotated forward by the shoulder belt force. A biasing spring 100 is provided to hold the pin 86 immediately in front of the wall 108 of the rear grip member to avoid inadvertent engagement of the pin 86 with one of the hooks 104 during normal vehicle operation.

Another embodiment of the invention is shown in FIG. 8. In this embodiment, a single member 110 is rotatable mounted to the frame back portion 42 and carries the retractor 56. The member 110 is generally U-shaped, forming an entrapment pocket 112. The tension load carrying member 64 passes through an opening 114 in the bracket 110. The pin 86 is positioned within the entrapment pocket and extends laterally beyond the side walls 116 of the bracket 110. A spring 100 holds the load carrying member 64 in an upright position. The bracket 110 has an upper portion 118 which rests upon the upper end of the frame back portion 42 and which prevents rearward or clockwise rotation of the bracket 110 as viewed in FIG. 8. During a frontal collision, the bracket will rotate counter-clockwise until the edges 120 of the side walls 116 engage the pin 86 and load the member 64 in tension.

During a vehicle collision, the load carrying member 64 is gripped at its upper end and loaded in tension. The result is a truss structure being formed by the load carrying member 64, the frame back portion 42 and the frame base portion 36. By detaching the upper end portion of the load carrying member 64 from the frame back portion 42 during normal vehicle operation, there is no truss structure. As a result, the backrest functions in a manner identical to a typical backrest which does not have a truss structure. A similar recliner mechanism can thus be used. In contrast, if the upper end of the load carrying member is always attached to the frame back portion, it would be necessary to provide a recliner mechanism in which the effective length of one member is variable to accomplish a change in the position of the backrest. This added complexity is avoided with the present invention by providing a load carrying member which is detached during normal vehicle operation when the benefits of the truss structure are not needed.

While the invention has been shown with a load carrying member 64 detached at its upper end, it is possible to have the detached end of the load carrying member at its lower end adjacent to the frame base portion. In such a case, the two grip members would be mounted to the frame base portion instead of the frame back portion. Such a configuration would require a low mounted retractor with the shoulder belt webbing being routed downward to a retractor attached to a grip member mounted to the frame base portion. The grip members could be front and rear spaced grip members similar to those shown in FIG. 3 or could be upper and lower grip members with the load carrying member 64, which is flexible, and extending horizontally between the two grip members. In such a case, the retractor would likely be mounted to the lower grip member which would rotate upward under the tension load in the belt webbing to pinch and grip the load carrying member 64 at its lower end.

Figure 9:
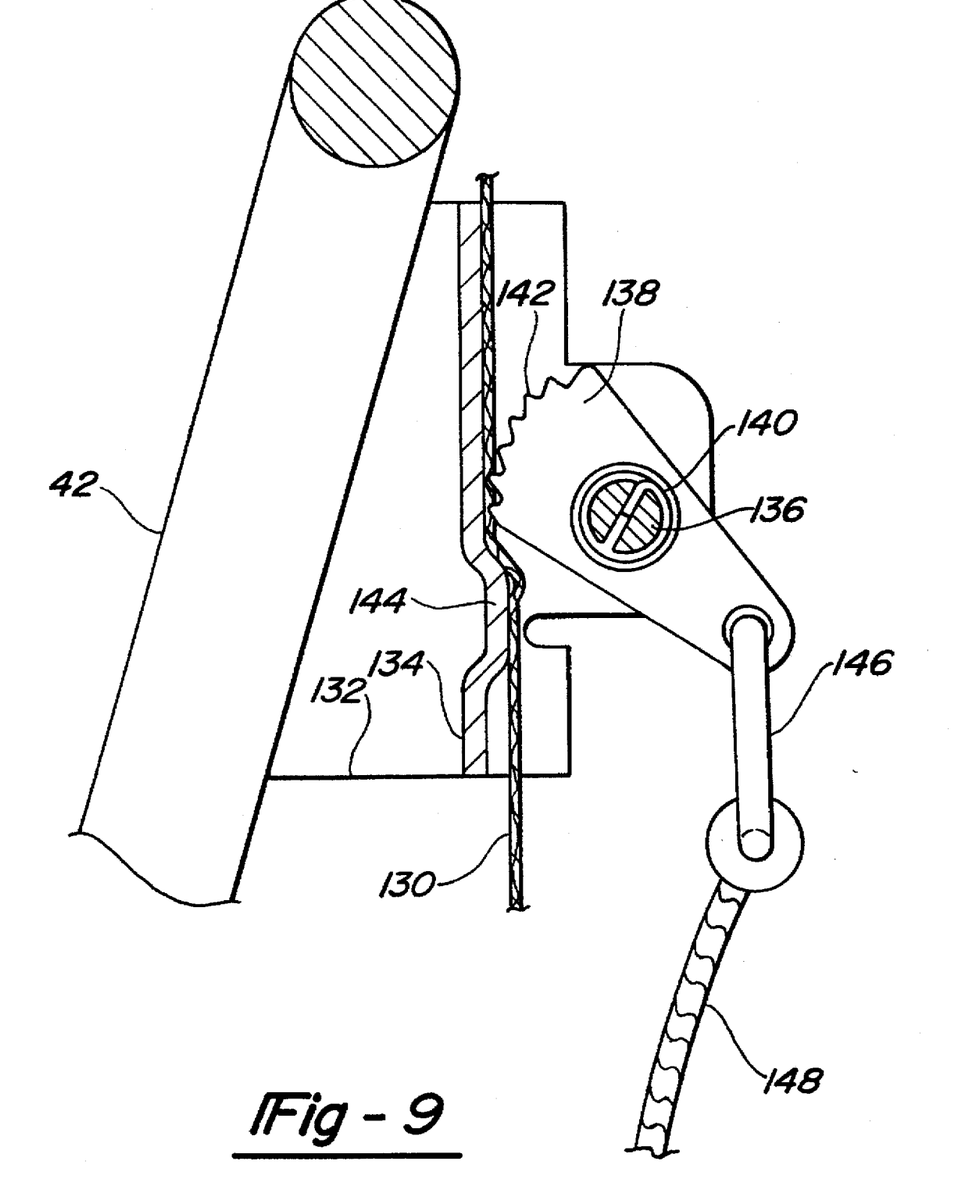
FIG. 9 is a fragmentary side elevation view of a gripping mechanism which continuously grips the load carrying member except during backrest adjustment.

An alternative embodiment of the invention is shown in FIG. 9. In this embodiment, the tension load carrying member 130 is normally attached to the upper end of the frame back portion 42. The tension load carrying member is only released from the backrest frame during adjustment of the backrest angle. A bracket 132 is attached to the frame back portion 42 and includes a base wall 134 and supports a pivot pin 136. A pawl 138 is rotatably carried about the pin 136. The tension load carrying member 130 passes between the base wall 134 and the pawl 138. Spring 140 is provided to bias the pawl 138 in a counter-clockwise direction as shown in FIG. 9 such that the friction ridges 142 of the pawl are forced against the load carrying member 130, trapping the member between the pawl and the base wall 134.

As in the previously described embodiments, the shoulder belt of the restraint system is coupled to the frame 42 of the backrest. During a vehicle collision, when the shoulder belt is loaded in tension, the backrest is tending to rotate forward. This places additional load on the load carrying member 130 pulling it downward as shown in FIG. 9. The downward pull on the member 130 tends to rotate the pawl in a counter-clockwise direction, further engaging the ridges 142 with the load carrying member. The pawl can rotate until it is pressed against the raised rib 144 in the base wall. In this position, the load carrying member 130 is firmly grasped and coupled to the backrest frame.

A release arm 146 is attached to the pawl and in turn coupled to a pull wire 148. The opposite end of the wire 148 is coupled to the recliner release lever 51 attached to the lower portion of the seat frame. When the recliner release lever is pulled to release the recliner mechanism 46 and adjust the seat back angle, the pawl 138 is pivoted clockwise and released from the load carrying member 130. This enables the seat back to be freely adjusted, independent of the load carrying member. Once the backrest angle has been adjusted, the pawl 138 will be returned by the spring 140 into a lock position gripping the tension load carrying member 130.

In summary, the invention provides a tension load carrying member which is coupled to the seat back frame forming a truss structure during high loading conditions. In addition, the member is released from the seat back frame enabling the seat back frame to be adjusted to a reclined position. The load carrying member provides additional strength to the seat back necessary to accomodate the higher seat belt loads. At the same time, more conventional seat components can be used, such as the recliner.

It is to be understood that the invention is not limited to the exact construction illustrated and described above, but that various changes and modifications may be made without departing from the spirit and scope of the invention as defined in the following claims.

We claim:

1. A vehicle seat assembly comprising:

a lower generally horizontal seat part and a back rest extending generally upwardly from the seat part;

a frame having a generally horizontal base portion and a back portion extending generally upwardly from the frame base portion within the back rest and being rotatably mounted to the frame base portion for rotation about a transverse axis to adjust the angular position of the frame back portion relative to the frame base portion;

recliner means for adjustably locking the frame back portion in position relative to the frame base portion;

a shoulder belt operatively associated with the frame back portion above the transverse axis and extending forward therefrom whereby tension in the shoulder belt urges the frame back portion to rotate forward about the transverse axis;

a tensile load carrying member having a lower end adjacent to the frame base portion rearward of the transverse axis and an upper end adjacent the frame back portion above the transverse axis, one of the upper and lower ends of the tensile load carrying member being attached to the frame and the other of the upper and lower ends being detached from the frame; and gripping means carried by the frame for gripping the detached end of the tensile load carrying member at least when the shoulder belt is loaded in tension above a predetermined quantity to attach the detached end of the tensile load carrying member to the frame whereby the load carrying member is loaded in tension and creates in combination with the frame a rigid triangular truss to resist forward rotation of the frame back portion and the gripping means detaching the detached end of the tensile load carrying member at least during angular adjustment of the frame back portion relative to the frame base portion.

2. The vehicle seat assembly of claim 1 wherein the gripping means is operatively associated with the shoulder belt for gripping the detached end of the tensile load carrying member in response to tension in the shoulder belt above a predetermined quantity to attach the detached end of the tensile load carrying member to the frame.

3. The vehicle seat assembly of claim 2 wherein the gripping means includes pair of grip members mounted to the frame between which the tensile load carrying, member extends, the grip members being spaced apart from one another to permit movement of the tensile load carrying member therebetween, one grip member being rotatably mounted to the frame for rotation about a second transverse axis, the one grip member being operatively coupled to the shoulder belt for rotation about the second transverse axis in response to tension in the shoulder belt above the predetermined quantity whereby the one grip member is moved toward the other grip member and the detached end of the tensile load carrying member is gripped between the grip members to attach the detached end of the tensile load carrying member to the frame.

4. The vehicle seat assembly of claim 1 wherein the gripping means is operatively associated with the recliner means to detach the detached end of the tensile load carrying member at least during angular adjustment of the frame back portion relative to the frame base portion.

5. The vehicle seat assembly of claim 4 wherein the gripping means includes a base wall and a pawl rotatable relative to the base wall with the tensile load carrying member passing therebetween;

bias means for urging the pawl toward the base wall to grip the tensile load carrying member between the pawl and the base wall; and release means extending between the recliner means and the gripping means for rotating the cam in opposition to the bias means to release the tensile load carrying member from the grip of the cam whereby the frame back portion is rotatable about the frame base portion.

6. A vehicle seat assembly comprising:

a lower generally horizontal seat part and a back rest extending generally upwardly from the seat part;

a frame having a generally horizontal base portion and a back portion extending generally upwardly from the frame base portion within the back rest and being rotatably mounted to the frame base portion for rotation about a transverse axis to adjust the angular position of the frame back portion relative to the frame base portion;

recliner means for adjustably locking the frame back portion in position relative to the frame base portion;

a shoulder belt coupled to the frame back portion above the transverse axis and extending forward therefrom whereby tension in the shoulder belt urges the frame back portion to rotate forward about the transverse axis;

a tensile load carrying member having a lower end adjacent to the frame base portion rearward of the transverse axis and an upper end adjacent the frame back portion above the transverse axis, one of the upper and lower end of the tensile load carrying member being attached to the frame and the other of the upper and lower ends being detached from the frame;

releasable gripping means carried by the frame for gripping the detached end of the tensile load carrying member to attach the detached end of the tensile load carrying member to the frame whereby when the shoulder belt is loaded in tension, the load carrying member is also loaded in tension and creates, in combination with the frame, a rigid triangular truss to resist forward rotation of the frame back portion; and release means extending between the recliner means and the gripping means for to releasing the tensile load carrying member in response to release of the recliner means whereby the frame back portion is rotatable about the frame base portion.

7. The vehicle seat assembly of claim 6 wherein the gripping means includes a base wall and a pawl rotatable relative to the base wall with the tensile load carrying member passing therebetween;

bias means for urging the pawl toward the base wall to grip the tensile load carrying member between the pawl and base wall; and the release means includes a pawl member coupled to the cam for rotating the pawl in opposition to the bias means to release the tensile load carrying member from the grip of the pawl whereby the frame back portion is rotatable about the frame base portion.

8. A vehicle seat assembly comprising:

a lower generally horizontal seat part and a back rest extending generally upwardly from the seat part and having a front surface for engagement by a seat occupant;

a frame having a generally horizontal base portion and a back portion extending generally upwardly from the frame base portion within the back rest and being rotatably mounted to the frame base portion for rotation about a transverse axis to adjust the angular position of the frame back portion relative to the frame base portion;

recliner means for adjustably locking the frame back portion in a fixed position relative to the frame base portion;

a shoulder belt coupled to the frame back portion above the transverse axis and extending forward from the front surface of the back rest whereby tension in the shoulder belt urges the frame back portion to rotate forward relative to the frame base portion;

a load carrying member having a lower end coupled to the frame base portion at a location rearward of the transverse axis and an upper end portion adjacent the frame back portion, the upper end portion being detached from the frame back portion; and gripping means operatively associated with the shoulder belt and carried by the frame back portion for gripping the upper end portion of the load carrying member in response to tension in the shoulder belt above a predetermined quantity to attach the upper end portion of the load carrying member to the frame back portion whereby the load carrying member is loaded in tension and resists forward rotation of the frame back portion.

9. The vehicle seat assembly of claim 8 wherein the load carrying member is a flexible strap.

10. The vehicle seat assembly of claim 8 wherein the load carrying member is a flexible strap of martinsite steel.

11. The vehicle seat assembly of claim 8 wherein the load carrying member is made of a material selected from the group of steel, fiberglass, plastic composite, and woven fabric.

12. The vehicle seat assembly of claim 8 wherein the gripping means includes front and rear grip members mounted to the frame back portion between which the load carrying member extends, the rear grip member being spaced rearward of the front grip member to permit movement of the load carrying member therebetween when the back rest angular position is adjusted, the rear grip member being rotatably mounted to the frame back portion for rotation about a second transverse axis, the rear grip member being operatively coupled to the shoulder belt for forward rotation about the second transverse axis in response to tension in the shoulder belt above the predetermined quantity whereby the rear grip member is moved forward and the upper end portion of the load carrying member is gripped between the front and rear grip members to attach the upper end portion of the load carrying member to the frame back portion.

13. The vehicle seat assembly of claim 12 wherein the front and rear grip members have complementary teeth for engagement with the load carrying member.

14. The vehicle seat assembly of claim 12 further comprising a transversely extending pin attached to the upper end portion of the load carrying member and projecting transversely beyond the load carrying member; and the rear grip member having a plurality of vertically spaced, forwardly projecting and upwardly facing hooks which are engagable with a lower surface of the pin when the rear grip member is rotated forward to attach the load carrying member to the frame back portion whereby the load carrying member resists forward rotation of the frame back portion.

15. The vehicle seat assembly of claim 12 further comprising a transversely extending pin attached to the upper end portion of the load carrying member and projecting transversely beyond the load carrying member; and the front grip member having a plurality of vertically spaced, rearwardly projecting and upwardly facing hooks which are engagable with a lower surface of the pin when the rear grip member is rotated forward and pushes the pin into engagement with the hooks to attach the load carrying member to the frame back portion whereby the load carrying member resists forward rotation of the frame back portion.

16. The vehicle seat assembly of claim 12 further comprising a belt retractor having a spool mounted to the rear grip member and the shoulder belt having an end portion wound upon the spool whereby a tensile load in the shoulder belt is transferred to the rear grip member.

* * * * *